United States Patent
Luo

(10) Patent No.: US 11,573,193 B2
(45) Date of Patent: Feb. 7, 2023

(54) RESISTANCE-INTEGRATED GAS SENSOR

(71) Applicant: Nuvoton Technology Corporation, Hsinchu (TW)

(72) Inventor: Jie-Chun Luo, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 571 days.

(21) Appl. No.: 16/595,471

(22) Filed: Oct. 8, 2019

(65) Prior Publication Data

US 2020/0200695 A1 Jun. 25, 2020

(30) Foreign Application Priority Data

Dec. 20, 2018 (TW) ................................. 107146272

(51) Int. Cl.
*G01N 27/14* (2006.01)
*G01N 27/04* (2006.01)
*G01N 27/407* (2006.01)

(52) U.S. Cl.
CPC ........... *G01N 27/14* (2013.01); *G01N 27/046* (2013.01); *G01N 27/4071* (2013.01); *G01N 27/4077* (2013.01)

(58) Field of Classification Search
CPC ..................... G01N 27/04–205; G01N 27/125
See application file for complete search history.

(56) References Cited

U.S. PATENT DOCUMENTS

| 9,494,548 | B2 | 11/2016 | Furuta |
| 2016/0290946 | A1* | 10/2016 | Montanya Silvestre ................ G01N 27/128 |
| 2017/0062504 | A1 | 3/2017 | Minixhofer et al. |
| 2018/0231481 | A1* | 8/2018 | Tsai ...................... G01N 27/12 |
| 2021/0003525 | A1* | 1/2021 | Kaita .................. G01N 27/125 |

FOREIGN PATENT DOCUMENTS

| JP | 2017211252 | 11/2017 |
| JP | 2017211252 A | * 11/2017 |
| TW | I603080 | 10/2017 |

OTHER PUBLICATIONS

Office Action of Taiwan Counterpart Application, dated Jul. 5, 2019, pp. 1-5.

* cited by examiner

Primary Examiner — Eric S. McCall
Assistant Examiner — Timothy P Graves
(74) Attorney, Agent, or Firm — JCIPRNET

(57) ABSTRACT

A resistance-integrated gas sensor is provided, including a substrate, a first metal oxide layer, an insulating layer, a contact metal layer, a contact hole, a second metal oxide layer, and an interdigitated electrode layer. The first metal oxide layer is disposed in the substrate. The insulating layer is disposed on the substrate and the first metal oxide layer. The contact metal layer and the contact hole are disposed in the insulating layer. The second metal oxide layer is disposed on the insulating layer. A portion of the interdigitated electrode layer is disposed on the insulating layer, and another portion is disposed in the second metal oxide layer. The contact metal layer and the contact hole connect the first metal oxide layer and the interdigitated electrode layer.

19 Claims, 12 Drawing Sheets

RESISTANCE-INTEGRATED GAS SENSOR

CROSS-REFERENCE TO RELATED APPLICATION

This application claims the priority benefit of Taiwan application serial no. 107146272, filed on Dec. 20, 2018. The entirety of the above-mentioned patent application is hereby incorporated by reference herein and made a part of this specification.

BACKGROUND

Technical Field

The invention is related to a gas sensor, and more particularly, to a resistance-integrated gas sensor.

Description of Related Art

A gas sensor device is usually composed of a heater and a gas sensor body, and it usually needs to be combined with other accessories (for example: reference resistor, voltage follower, analog digital converter (ADC) or a computer, etc.), so that a gas sensor can be applied to life.

As for the heaters, energy consumption problems and potential operational risks exist. Therefore, in the research and development process of gas sensor, the effect of reducing energy consumption and cost can be achieved by removing the heater. However, it is still necessary to connect external resistors to achieve resistance matching for the applications. The disadvantages of external series resistors are as follows: 1) As for the more unmatched resistors, the higher resolution ADC is required; 2) The external circuits cannot avoid environmental noise. As a result, the high-resolution ADC will increase the cost of use, and the noise will cause errors in the judgment. In addition, the sensing thin film material of the gas sensor has a higher resistance value, for example, millions of ohms (Me) to billions of ohms (Ge), so it is not easy to match SMD resistors. To sum up, the aforementioned disadvantages are the problems for this type of gas sensors.

Based on the above, a resistance-integrated gas sensor has been developed, so as to reduce the environmental noise and the usage area of external circuits, thereby reducing the cost of use and errors, which is an important subject for current research.

SUMMARY

The invention provides a stacked type resistance-integrated gas sensor. Combined with specific materials, the external resistors are integrated into the gas sensor. Therefore, the use of external circuits is reduced, which allows the direct integration with voltage followers or even analog-to-digital converters, so as to reduce environmental noise and the usage area of external circuit, and further reduce the cost of use and the judgment errors.

The invention provides a resistance-integrated gas sensor including a substrate, a first metal oxide layer, a first insulating layer, a contact metal layer, a first contact hole, a second metal oxide layer and an interdigitated electrode layer. The first metal oxide layer is disposed in the substrate. The first insulating layer is disposed on the substrate and the first metal oxide layer. The contact metal layer is disposed in the first insulating layer. The first contact hole is disposed in the first insulating layer and located on the contact metal layer. The second metal oxide layer is disposed on the first insulating layer. The interdigitated electrode layer has a first portion and a second portion, wherein the first portion is disposed on first insulating layer, and the second portion is disposed in the second metal oxide layer. The contact metal layer and the first contact hole connect the first metal oxide layer and the interdigitated electrode layer.

In an embodiment of the invention, the resistance-integrated gas sensor further includes a second insulating layer disposed between the first insulating layer and the interdigitated electrode layer, a second contact hole and a metal heating layer are disposed in the second insulating layer, and the second contact hole is located on the metal heating layer, the metal heating layer and the second contact hole connect the first contact hole and the interdigitated electrode layer.

In an embodiment of the invention, the first metal oxide layer is a serpentine structure.

In an embodiment of the invention, the first metal oxide layer is an inverted triangular structure.

In an embodiment of the invention, a material of the first metal oxide layer is the same as a material of the second metal oxide layer.

In an embodiment of the invention, the material of the first metal oxide layer and the second metal oxide layer includes zinc oxide, molybdenum oxide, aluminum oxide, titanium oxide, tin oxide, tungsten oxide or a dopant thereof.

In an embodiment of the invention, a forming method the second metal oxide layer includes a 3D printing process.

In an embodiment of the invention, the substrate is etched to have a recess, the first metal oxide layer is disposed in the recess, and an etching depth is 10 nm to 10 μm.

In an embodiment of the invention, a material of the substrate includes ceramic or silicon.

In an embodiment of the invention, a material of the contact metal layer includes aluminum or gold.

In an embodiment of the invention, a material of the first contact hole includes tungsten or aluminum.

In an embodiment of the invention, a material of the interdigitated electrode layer includes aluminum, gold or platinum.

In an embodiment of the invention, a material of the metal heating layer includes aluminum, gold or platinum.

In an embodiment of the invention, a material of the second contact hole is the same as a material of the first contact hole.

Based on the above, the invention provides a stacked type resistance-integrated gas sensor, in which the first metal oxide layer and the second metal oxide layer are made of the same material, the upper second metal oxide layer is used for sensing, and the lower first metal oxide layer is used as an internal resistor. Therefore, the external resistor is integrated into the gas sensor without additional external resistors. In this way, the use of external circuits can be reduced, so that it can be directly integrated with a voltage follower or even an analog digital converter. As a result, the environmental noise and usage area of external circuits can be reduced, thereby reducing the cost of use and the judgment error.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
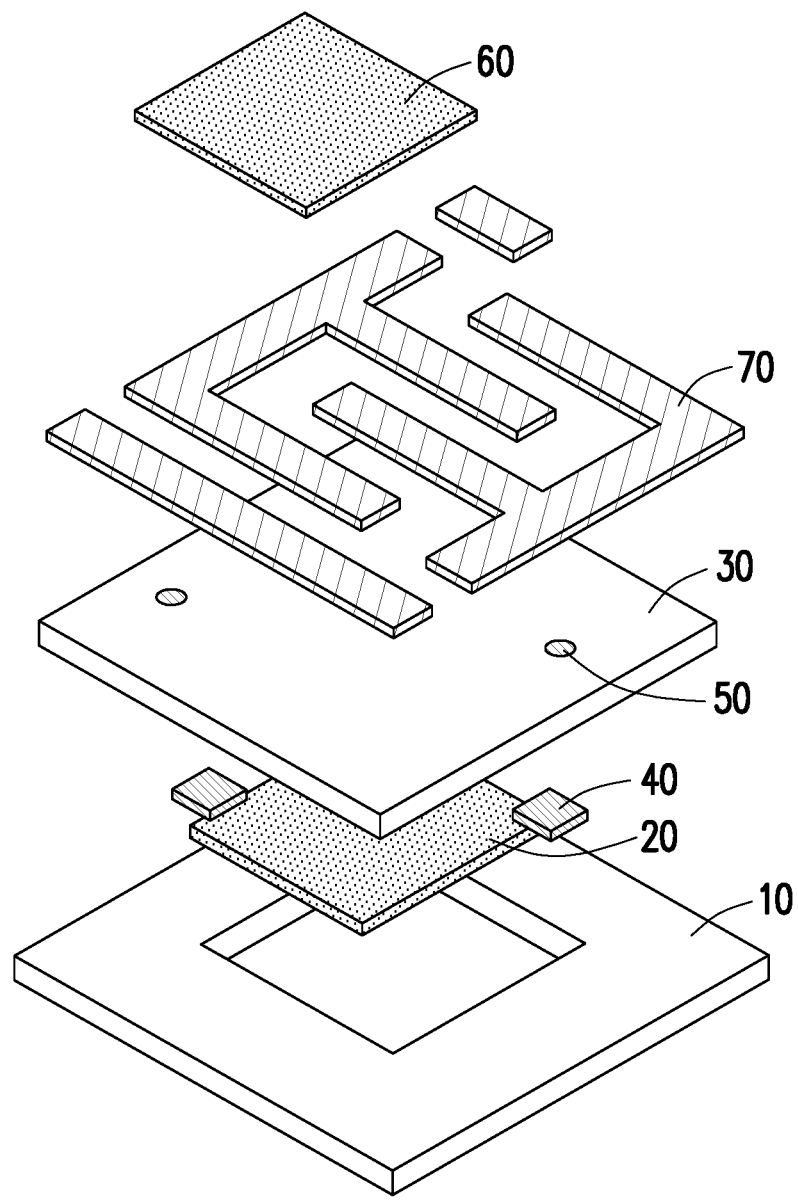
FIG. 1A is an explode view of a resistance-integrated gas sensor according to the first embodiment of the invention.
Figure 1B:
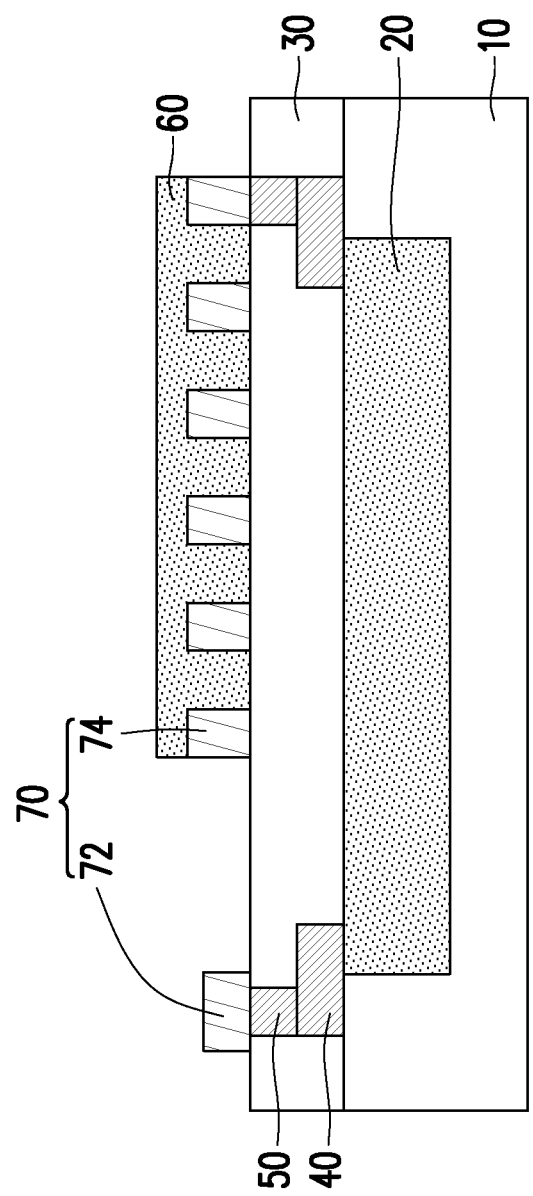
FIG. 1B is a cross-sectional schematic view of a resistance-integrated gas sensor according to the first embodiment of the invention.

FIG. 1A is an explode view of a resistance-integrated gas sensor according to the first embodiment of the invention. FIG. 1B is a cross-sectional schematic view of a resistance-integrated gas sensor according to the first embodiment of the invention.

Referring to FIG. 1A and FIG. 1B, in the present embodiment, a resistance-integrated gas sensor includes a substrate 10, a first metal oxide layer 20, a first insulating layer 30, a contact metal layer 40, a first contact hole 50, a second metal oxide layer 60 and an interdigitated electrode layer 70. More particularly, the first metal oxide layer 20 is disposed in the substrate 10. The first insulating layer 30 is disposed on the substrate 10 and the first metal oxide layer 20. The first metal oxide layer 20 is isolated from the external environment by the first insulating layer 30, and is not affected by external gases. Therefore, when the first metal oxide layer 20 is used as the internal resistance, the resistance can be a fixed value. The contact metal layer 40 and the first contact hole 50 are disposed in the first insulating layer 30, and the first contact hole 50 is located on the contact metal layer 40. The second metal oxide layer 60 is disposed on the first insulating layer 30. The interdigitated electrode layer 70 has a first portion 72 and a second portion 74, wherein the first portion 72 is disposed on the first insulating layer 30, and the second portion 74 is disposed in the second metal oxide layer 60. The contact metal layer 40 and the first contact hole 50 connect the first metal oxide layer 20 and the interdigitated electrode layer 70.

In the present embodiment, the manufacturing method of the resistance-integrated gas sensor includes the following steps. First, the substrate 10 is etched, and the material of the substrate 10 may include ceramic or tantalum. The substrate 10 is etched to have a recess, and the first metal oxide layer 20 is disposed in the recess. The etching depth may be 10 nm to 10 μm, for example. The resistance of the first metal oxide layer 20 as the internal resistance can be controlled by the etching depth of the substrate 10, so as to reduce the opportunity to modify the mask. Next, the first metal oxide layer 20 is coated, and then chemical mechanical polishing (CMP) process is performed for planarization. The material of the first metal oxide layer 20 is the same as the material of the second metal oxide layer 60, and may include zinc oxide, molybdenum oxide, aluminum oxide, titanium oxide, tin oxide, tungsten oxide or a dopant thereof: iron, aluminum, gold, lead, platinum, indium, phosphorus, boron, antimony, bismuth, antimony, bismuth, cobalt, nickel, copper, silver, chromium or graphene. After that, deposition and etching process of the contact metal layer 40 are performed, and the material of the contact metal layer 40 may include aluminum or gold. Afterwards, the first insulating layer 30 is deposited and etched, and the first contact hole 50 is deposited. The material of the first contact hole 50 may include tungsten or aluminum, and the first contact hole 50 is subjected to a chemical mechanical polishing process for planarization. Finally, deposition and etching process of the interdigitated electrode layer 70 are performed. The material of the interdigitated electrode layer 70 may include aluminum, gold or platinum. Then, the second metal oxide layer 60 is formed. The forming method of the second metal oxide layer 60 includes a 3D printing process. The formation of the second metal oxide layer 60 can be more flexible through the 3D printing process, and it is suitable for being disposed in different devices. In this way, the production of the resistance-integrated gas sensor can be completed.

In the resistance-integrated gas sensor of the present embodiment, the material of the first metal oxide layer 20 is the same as the material of the second metal oxide layer 60. The upper second metal oxide layer 60 is used for sensing, and the lower first metal oxide layer 20 is used as an internal resistor. Therefore, the external resistor is integrated into the gas sensor without additional external resistors. In this way, the use of external circuits can be reduced, so that it can be directly integrated with a voltage follower or even an analog digital converter. As a result, the environmental noise and usage area of external circuits can be reduced (for example, at least 0.58*0.29 mm$^2$ of external circuits area can be reduced), and the output signal is the partial pressure value, thereby reducing the cost of use and the judgment error.

Figure 2A:
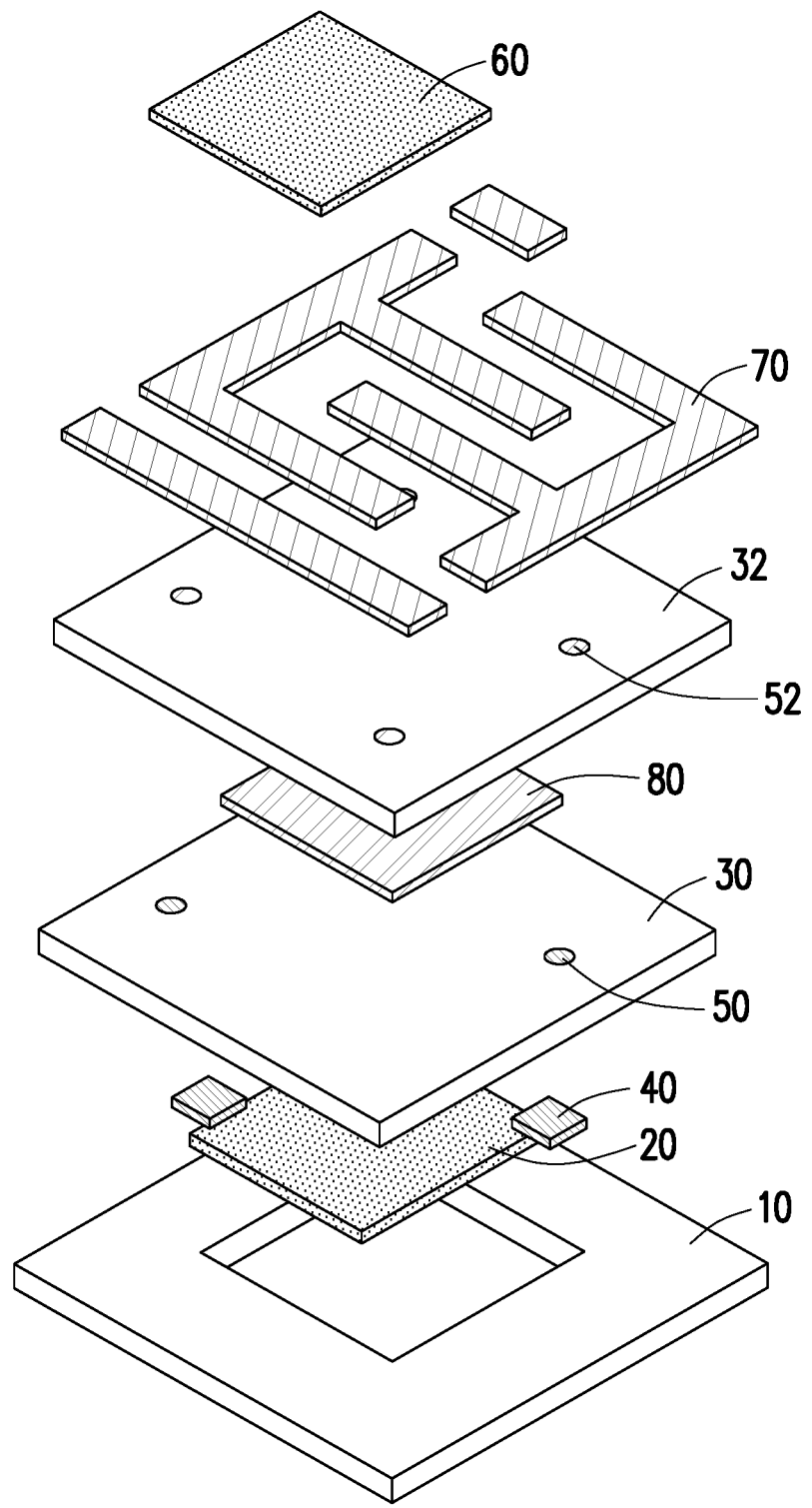
FIG. 2A is an explode view of a resistance-integrated gas sensor according to the second embodiment of the invention.
Figure 2B:
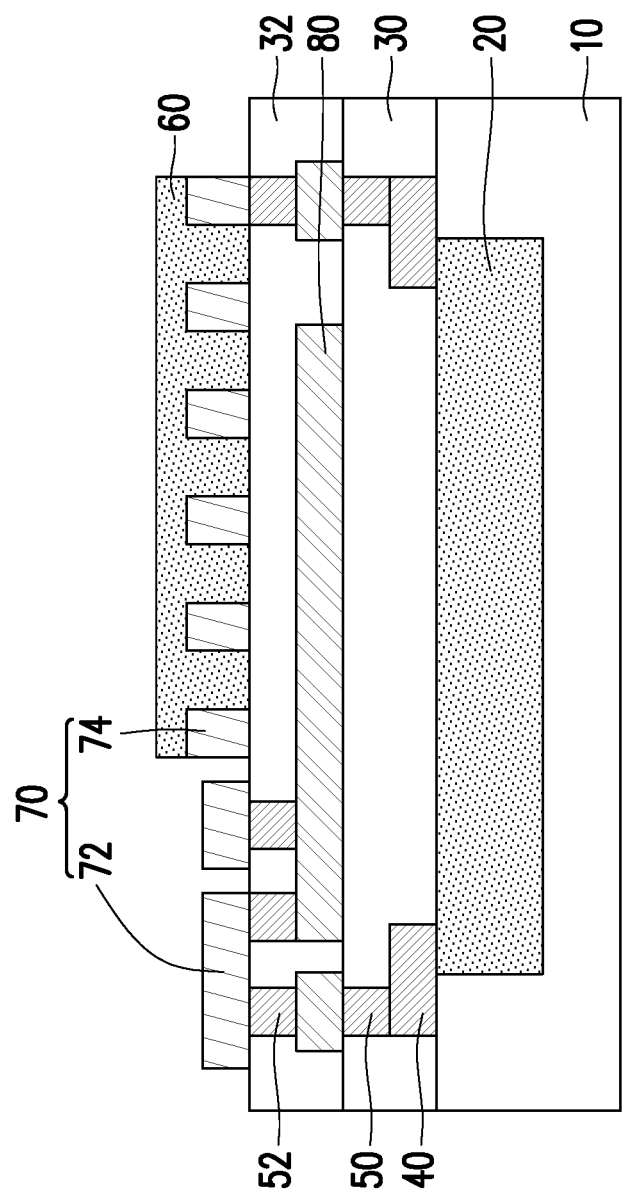
FIG. 2B is a cross-sectional schematic view of a resistance-integrated gas sensor according to the second embodiment of the invention.

FIG. 2A is an explode view of a resistance-integrated gas sensor according to the second embodiment of the invention. FIG. 2B is a cross-sectional schematic view of a resistance-integrated gas sensor according to the second embodiment of the invention. The second embodiment shown in FIG. 2A and FIG. 2B is similar to the first embodiment shown in FIG. 1A and FIG. 1B, and therefore the same components are represented by the same reference numerals and are not repeated herein.

Referring to FIG. 2A and FIG. 2B, the difference between the present embodiment and the aforementioned first embodiment is that, the resistance-integrated gas sensor of the present embodiment further includes a second insulating layer 32 disposed between the first insulating layer 30 and the interdigitated electrode layer 70. A second contact hole 52 and a metal heating layer 80 are disposed in the second insulating layer 32, and the second contact hole 52 is located on the metal heating layer 80. The metal heating layer 80 and the second contact hole 52 connect the first contact hole 50 and the interdigitated electrode layer 70. More particularly, the material of the second contact hole 52 is the same as the material of the first contact hole 50. The material of the metal heating layer 80 may include aluminum, gold or platinum. By integrating the metal heating layer 80 into the gas sensor, the sensitivity can be improved and the integrated micro-area can be achieved.

Figure 3A:
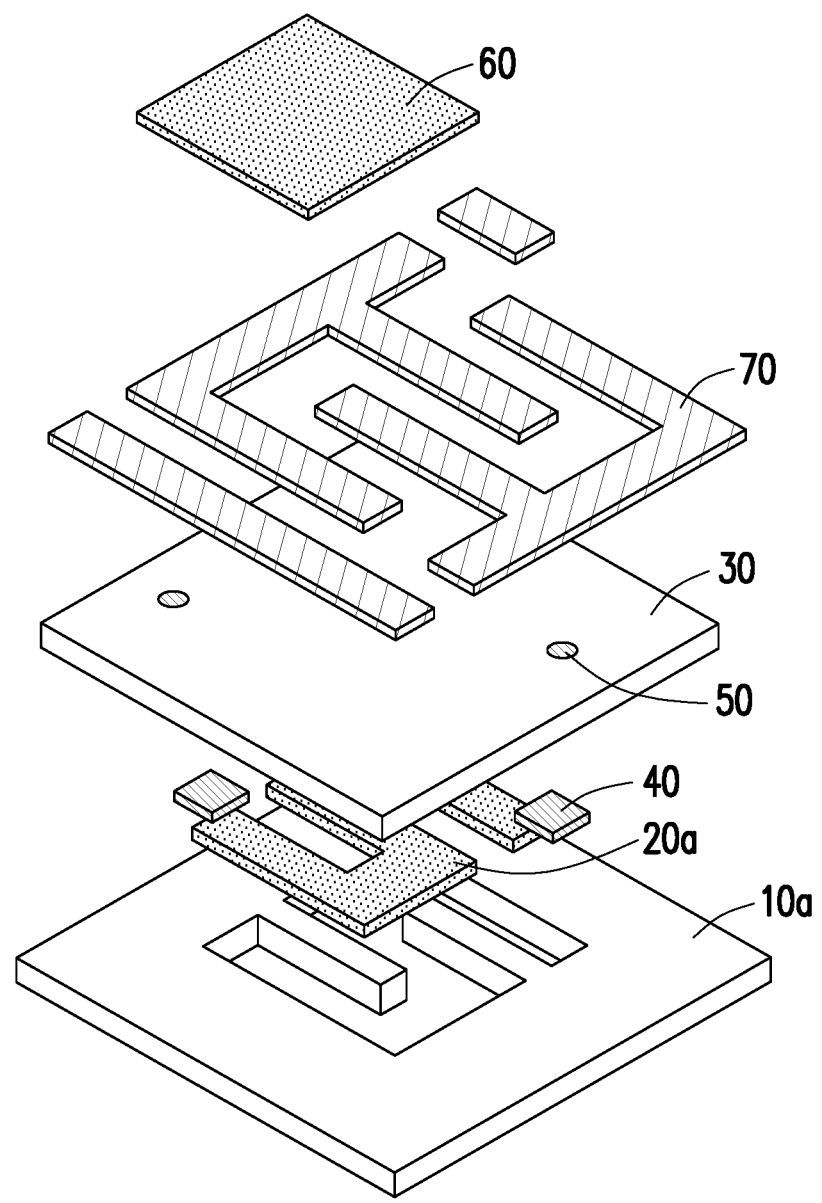
FIG. 3A is an explode view of a resistance-integrated gas sensor according to the third embodiment of the invention.
Figure 3B:
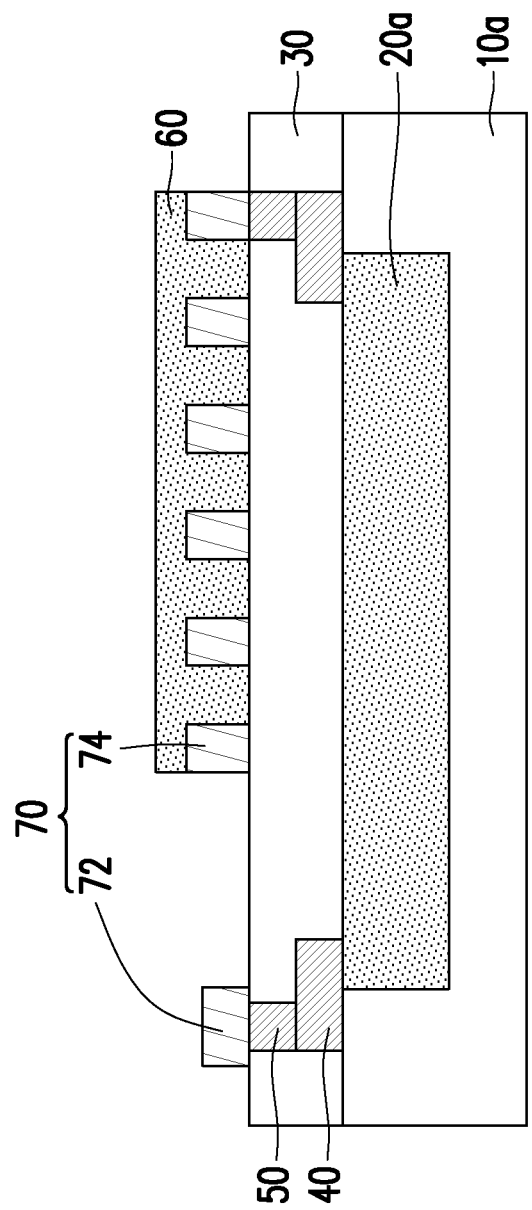
FIG. 3B is a cross-sectional schematic view of a resistance-integrated gas sensor according to the third embodiment of the invention.

FIG. 3A is an explode view of a resistance-integrated gas sensor according to the third embodiment of the invention. FIG. 3B is a cross-sectional schematic view of a resistance-integrated gas sensor according to the third embodiment of the invention. The third embodiment shown in FIG. 3A and FIG. 3B is similar to the first embodiment shown in FIG. 1A and FIG. 1B, and therefore the same components are represented by the same reference numerals and are not repeated herein.

Referring to FIG. 3A and FIG. 3B, the difference between the present embodiment and the aforementioned first embodiment is that, the first metal oxide layer 20a is a serpentine structure, and the etched substrate 10a is used for accommodate the first metal oxide layer 20a with serpentine structure. Due to the material properties of the gas sensor, humidity is also a factor affecting the reaction of the gas sensor. The serpentine structure of the first metal oxide layer 20a can be regarded as a series connection of a plurality of sheet resistances. Compared to a single piece resistance of the resistance-integrated gas sensor, the serpentine structure can be designed to match the humidity of the application environment, and the resistance value thereof can be doubled, so that ½ voltage source can be separated under different humidity conditions. In the absence of the metal heating layer, the effect of humidity is more pronounced. In order to achieve a ½ partial pressure effect, the serpentine structure design of the first metal oxide layer 20a plays an important role in the gas sensor without a heating plate.

Figure 4A:
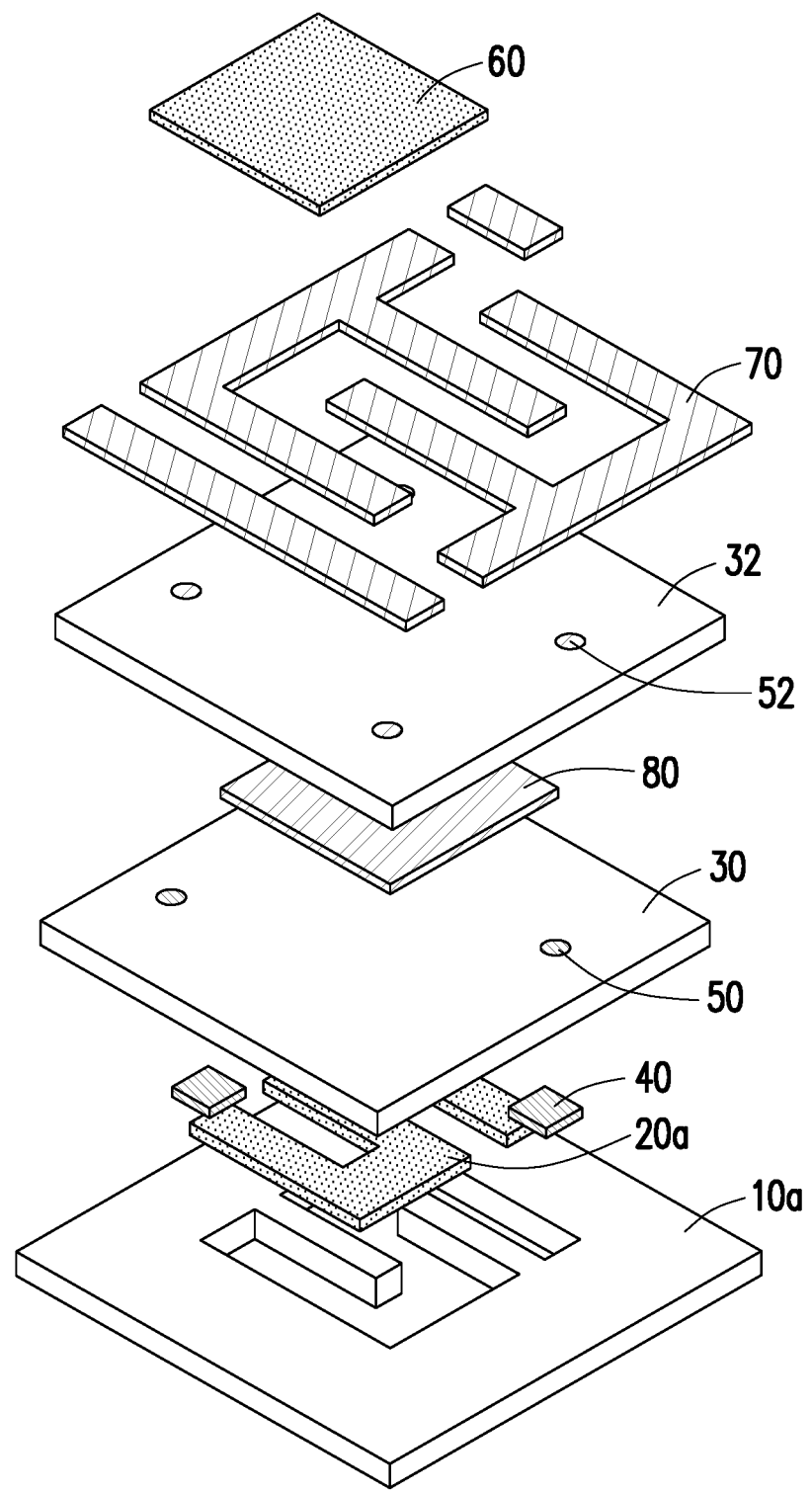
FIG. 4A is an explode view of a resistance-integrated gas sensor according to the fourth embodiment of the invention.
Figure 4B:
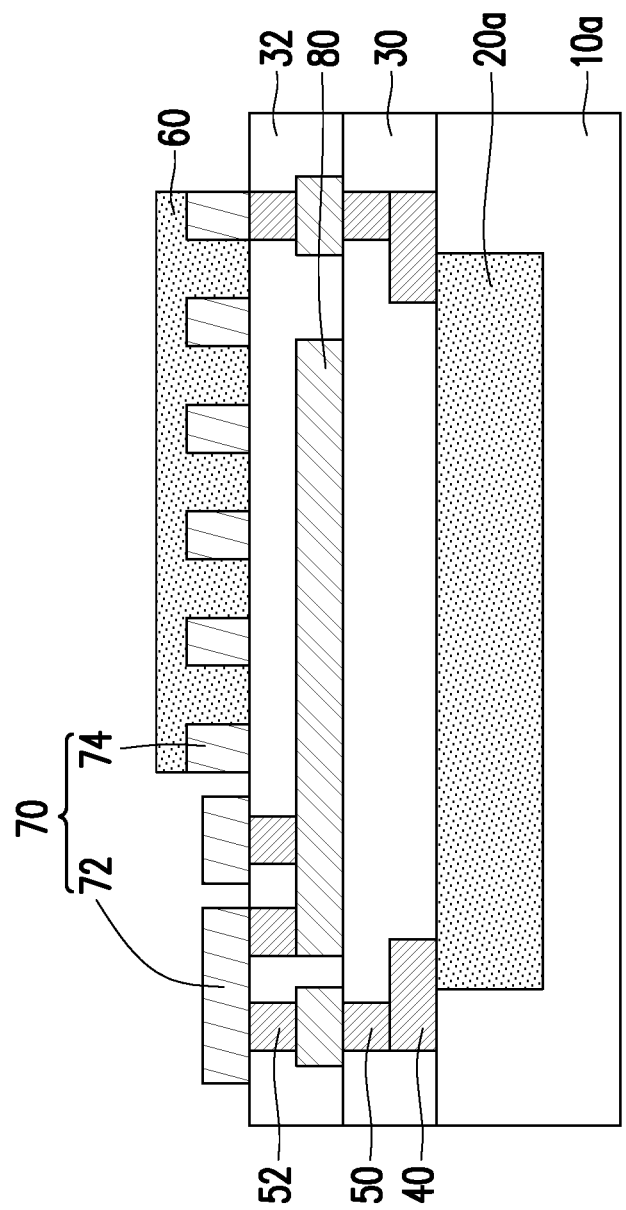
FIG. 4B is a cross-sectional schematic view of a resistance-integrated gas sensor according to the fourth embodiment of the invention.

FIG. 4A is an explode view of a resistance-integrated gas sensor according to the fourth embodiment of the invention. FIG. 4B is a cross-sectional schematic view of a resistance-integrated gas sensor according to the fourth embodiment of the invention. The fourth embodiment shown in FIG. 4A and FIG. 4B is similar to the third embodiment shown in FIG. 3A and FIG. 3B, and therefore the same components are represented by the same reference numerals and are not repeated herein.

Referring to FIG. 4A and FIG. 4B, the difference between the present embodiment and the aforementioned third embodiment is that, the resistance-integrated gas sensor of the present embodiment further includes a second insulating layer 32 disposed between the first insulating layer 30 and the interdigitated electrode layer 70. A second contact hole 52 and a metal heating layer 80 are disposed in the second insulating layer 32, and the second contact hole 52 is located on the metal heating layer 80. The metal heating layer 80 and the second contact hole 52 connect the first contact hole 50 and the interdigitated electrode layer 70. More particularly, the material of the second contact hole 52 is the same as the material of the first contact hole 50. The material of the metal heating layer 80 may include aluminum, gold or platinum. By integrating the metal heating layer 80 into the gas sensor having the first metal oxide layer 20a with serpentine structure, the sensitivity can be improved and it can be designed to match the humidity of the application environment, and the resistance value thereof can be doubled, so that ½ voltage source can be separated under different humidity conditions.

Figure 5A:
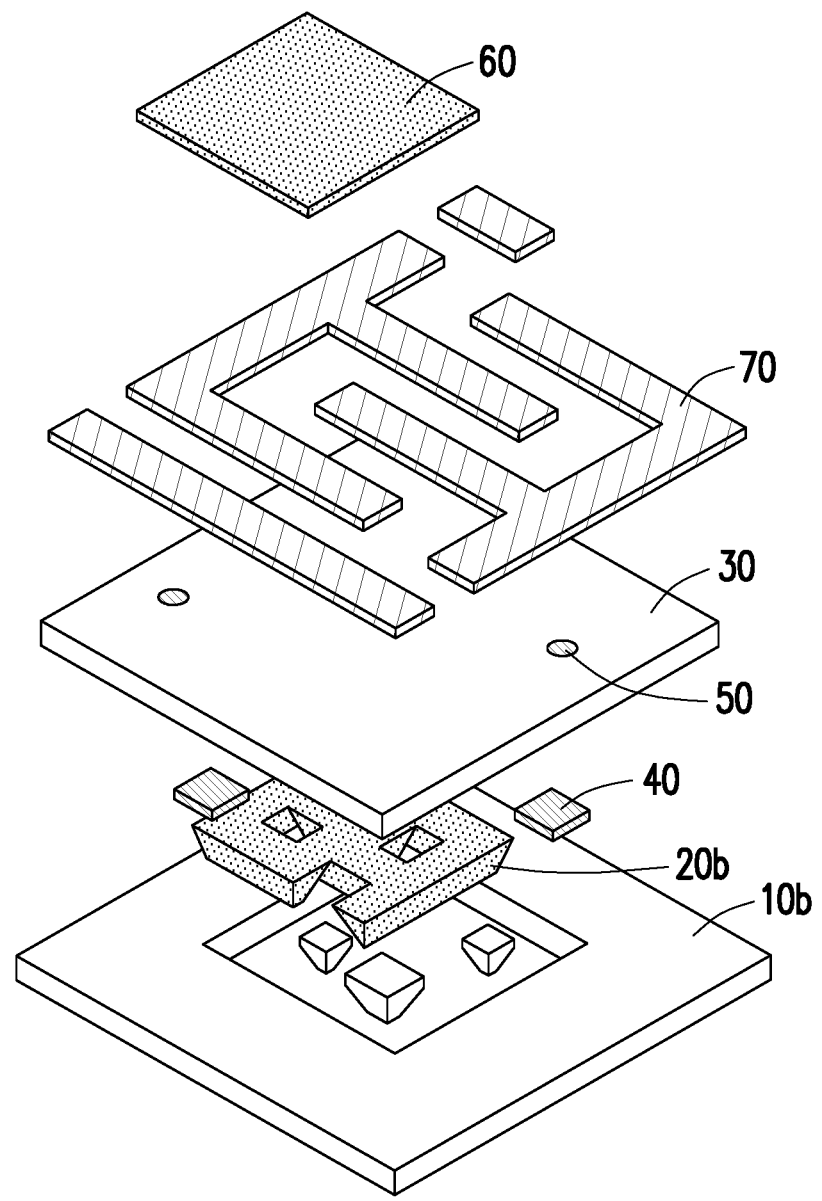
FIG. 5A is an explode view of a resistance-integrated gas sensor according to the fifth embodiment of the invention.
Figure 5B:
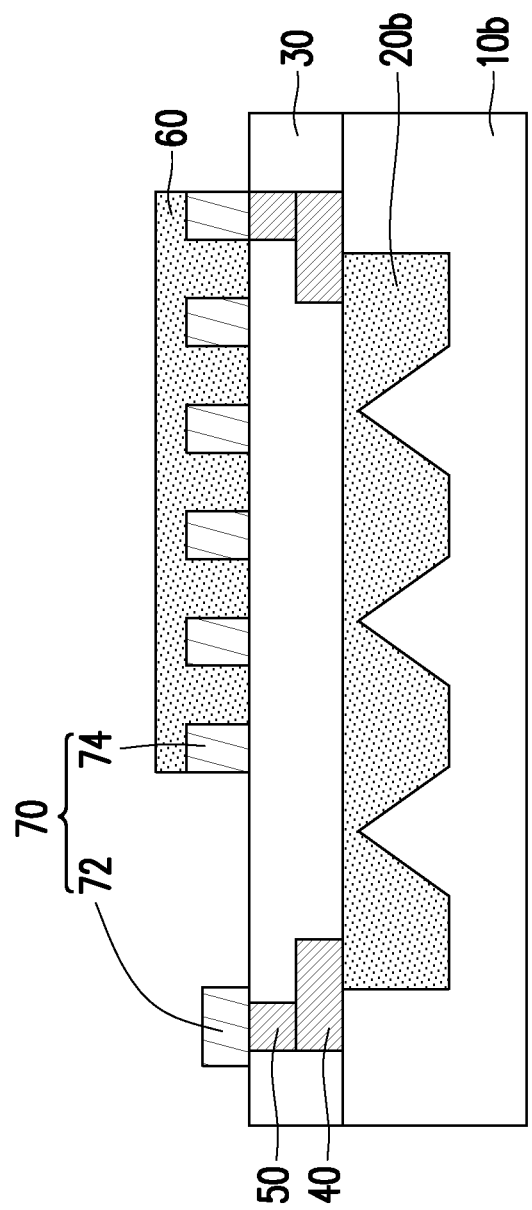
FIG. 5B is a cross-sectional schematic view of a resistance-integrated gas sensor according to the fifth embodiment of the invention.

FIG. 5A is an explode view of a resistance-integrated gas sensor according to the fifth embodiment of the invention. FIG. 5B is a cross-sectional schematic view of a resistance-integrated gas sensor according to the fifth embodiment of the invention. The fifth embodiment shown in FIG. 5A and FIG. 5B is similar to the first embodiment shown in FIG. 1A and FIG. 1B, and therefore the same components are represented by the same reference numerals and are not repeated herein.

Referring to FIG. 5A and FIG. 5B, the difference between the present embodiment and the aforementioned first embodiment is that, the first metal oxide layer 20b is an inverted triangular structure, and the etched substrate 10b is used for accommodate the first metal oxide layer 20b with inverted triangular structure. Utilizing the over-etching characteristics of wet etching, the mask of the interdigitated electrode layer 70 can be used to reduce the additional mask design.

Figure 6A:
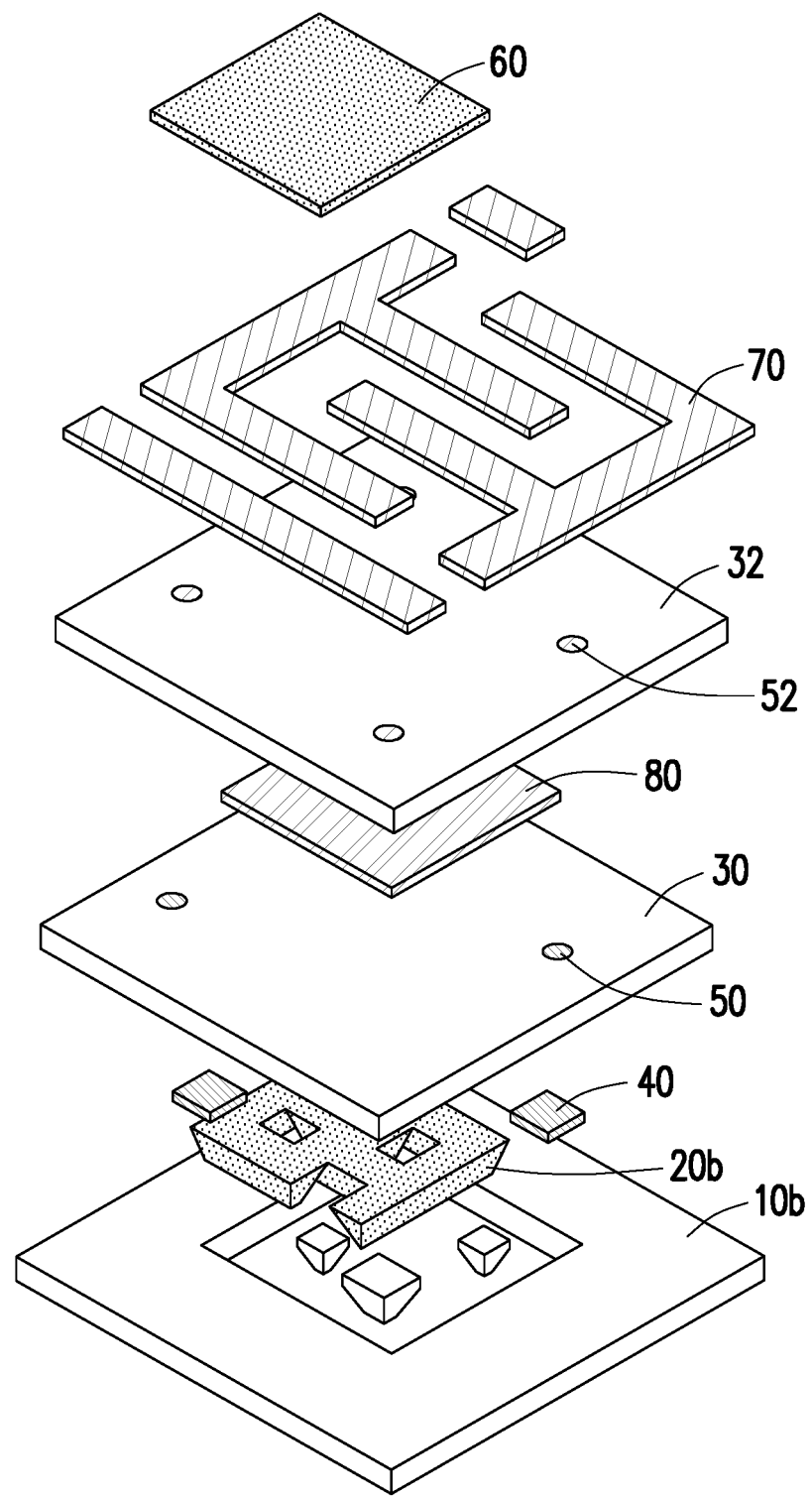
FIG. 6A is an explode view of a resistance-integrated gas sensor according to the sixth embodiment of the invention.
Figure 6B:
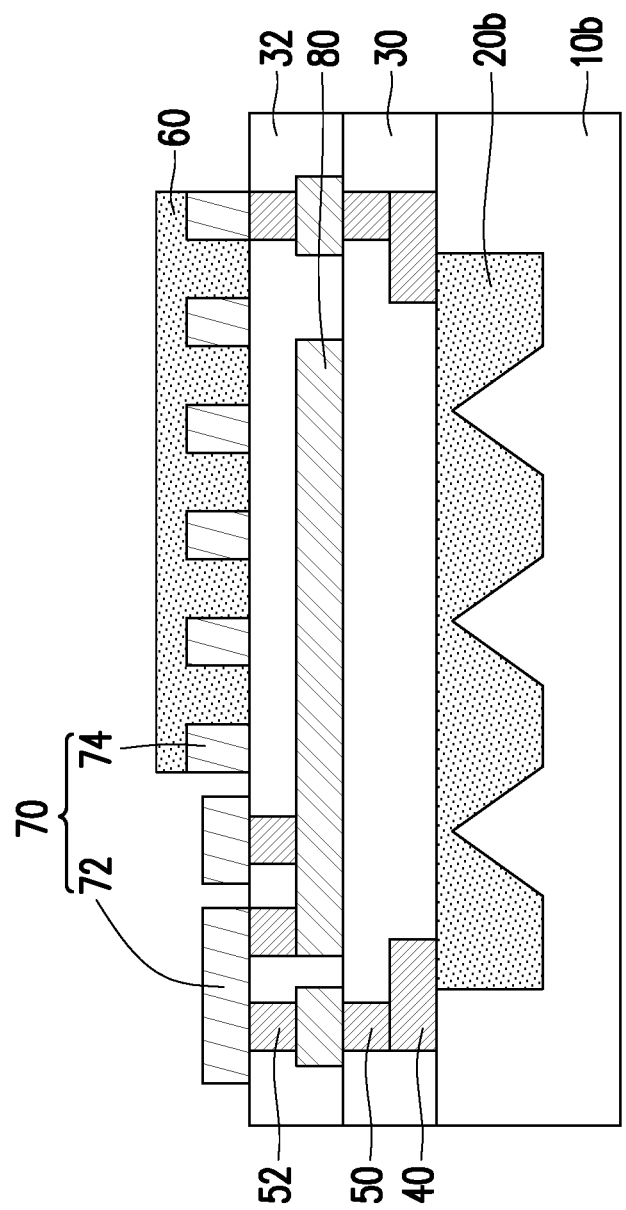
FIG. 6B is a cross-sectional schematic view of a resistance-integrated gas sensor according to the sixth embodiment of the invention.

FIG. 6A is an explode view of a resistance-integrated gas sensor according to the sixth embodiment of the invention. FIG. 6B is a cross-sectional schematic view of a resistance-integrated gas sensor according to the sixth embodiment of the invention. The sixth embodiment shown in FIG. 6A and FIG. 6B is similar to the fifth embodiment shown in FIG. 5A and FIG. 5B, and therefore the same components are represented by the same reference numerals and are not repeated herein.

Referring to FIG. 6A and FIG. 6B, the difference between the present embodiment and the aforementioned fifth embodiment is that, the resistance-integrated gas sensor of the present embodiment further includes a second insulating layer 32 disposed between the first insulating layer 30 and the interdigitated electrode layer 70. A second contact hole 52 and a metal heating layer 80 are disposed in the second insulating layer 32, and the second contact hole 52 is located on the metal heating layer 80. The metal heating layer 80 and the second contact hole 52 connect the first contact hole 50 and the interdigitated electrode layer 70. More particularly, the material of the second contact hole 52 is the same as the material of the first contact hole 50. The material of the metal heating layer 80 may include aluminum, gold or platinum. The material of the metal heating layer 80 may include aluminum, gold or platinum. By integrating the metal heating layer 80 into the gas sensor having the first metal oxide layer 20b with inverted triangular structure, the sensitivity can be improved.

Based on the above, the invention provides a resistance-integrated gas sensor, in which the first metal oxide layer and the second metal oxide layer are made of the same material, the upper second metal oxide layer is used for sensing, and the lower first metal oxide layer is used as an internal resistor. Therefore, the external resistor is integrated into the gas sensor without additional external resistors. In addition, the first metal oxide layer as the internal resistor isolated from the external environment by the, so the resistance can be a fixed value. In this way, the use of external circuits can be reduced, so that it can be directly integrated with a voltage follower or even an analog digital converter. As a result, the environmental noise and usage area of external circuits can be reduced, thereby reducing the cost of use and the judgment error.

On the other hand, the structure design of the first metal oxide layer in the resistance-integrated gas sensor can be adjusted. The serpentine structure can be designed to match the humidity of the application environment, and the resistance value thereof can be doubled, so that ½ voltage source can be separated under different humidity conditions. Otherwise, by using the inverted triangular structure, the mask of the interdigitated electrode layer can be used to reduce the additional mask design. In addition, the metal heating layer can be disposed in the resistance-integrated gas sensor of the present invention, so as to improve the sensitivity.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A resistance-integrated gas sensor, comprising:
   a substrate;
   a first metal oxide layer disposed in the substrate;
   a first insulating layer disposed on the substrate and the first metal oxide layer;
   a contact metal layer disposed in the first insulating layer;
   a first contact hole disposed in the first insulating layer and located on the contact metal layer;
   a second metal oxide layer disposed on the first insulating layer; and
   an interdigitated electrode layer having a first portion and a second portion, wherein the first portion is disposed on the first insulating layer, and the second portion is disposed in the second metal oxide layer,
   wherein the contact metal layer and the first contact hole connect the first metal oxide layer and the interdigitated electrode layer,
   wherein the substrate is etched to have a recess, the first metal oxide layer is disposed in the recess, and an etching depth is 10 nm to 10 µm.

2. The resistance-integrated gas sensor of claim 1, further comprising a second insulating layer disposed between the first insulating layer and the interdigitated electrode layer, a second contact hole and a metal heating layer are disposed in the second insulating layer, and the second contact hole is located on the metal heating layer, the metal heating layer and the second contact hole connect the first contact hole and the interdigitated electrode layer.

3. The resistance-integrated gas sensor of claim 1, wherein the first metal oxide layer is a serpentine structure.

4. The resistance-integrated gas sensor of claim 3, further comprising a second insulating layer disposed between the first insulating layer and the interdigitated electrode layer, a second contact hole and a metal heating layer are disposed in the second insulating layer, and the second contact hole is located on the metal heating layer, the metal heating layer and the second contact hole connect the first contact hole and the interdigitated electrode layer.

5. The resistance-integrated gas sensor of claim 1, wherein the first metal oxide layer is an inverted triangular structure.

6. The resistance-integrated gas sensor of claim 5, further comprising a second insulating layer disposed between the first insulating layer and the interdigitated electrode layer, a second contact hole and a metal heating layer are disposed in the second insulating layer, and the second contact hole is located on the metal heating layer, the metal heating layer and the second contact hole connect the first contact hole and the interdigitated electrode layer.

7. The resistance-integrated gas sensor of claim 1, wherein a material of the first metal oxide layer is the same as a material of the second metal oxide layer.

8. The resistance-integrated gas sensor of claim 7, wherein the material of the first metal oxide layer and the second metal oxide layer includes zinc oxide, molybdenum oxide, aluminum oxide, titanium oxide, tin oxide, tungsten oxide or a dopant thereof.

9. The resistance-integrated gas sensor of claim 1, wherein a forming method of the second metal oxide layer includes a 3D printing process.

10. The resistance-integrated gas sensor of claim 1, wherein a material of the substrate includes ceramic or silicon.

11. The resistance-integrated gas sensor of claim 1, wherein a material of the contact metal layer includes aluminum or gold.

12. The resistance-integrated gas sensor of claim 1, wherein a material of the first contact hole includes tungsten or aluminum.

13. The resistance-integrated gas sensor of claim 1, wherein a material of the interdigitated electrode layer includes aluminum, gold or platinum.

14. The resistance-integrated gas sensor of claim 2, wherein a material of the metal heating layer includes aluminum, gold or platinum.

15. The resistance-integrated gas sensor of claim 2, wherein a material of the second contact hole is the same as a material of the first contact hole.

16. The resistance-integrated gas sensor of claim 4, wherein a material of the metal heating layer includes aluminum, gold or platinum.

17. The resistance-integrated gas sensor of claim 4, wherein a material of the second contact hole is the same as a material of the first contact hole.

18. The resistance-integrated gas sensor of claim 6, wherein a material of the metal heating layer includes aluminum, gold or platinum.

19. The resistance-integrated gas sensor of claim 6, wherein a material of the second contact hole is the same as a material of the first contact hole.

* * * * *